United States Patent [19]
Taylor

[11] 3,778,231
[45] Dec. 11, 1973

[54] METHOD OF PRODUCING SILICON NITRIDE ARTICLES

[75] Inventor: Richard Alan Taylor, Coldfield, England

[73] Assignee: The Birmingham Small Arms Company Limited, Birmingham, England

[22] Filed: Mar. 11, 1971

[21] Appl. No.: 123,431

Related U.S. Application Data

[63] Continuation-in-part of Ser. No. 749,987, Aug. 5, 1968, abandoned.

[52] U.S. Cl. .................. 423/290, 264/66, 264/162
[51] Int. Cl. ...................... C01b 21/06, B29f 5/02
[58] Field of Search ............... 23/191, 192; 264/65, 264/66, 67

[56] References Cited
UNITED STATES PATENTS
3,222,438   12/1965   Parr et al. ........................ 23/191 X OTHER PUBLICATIONS
Mellor, Treatise on Inorganic and Theoretical Chemistry, Vol. 8, p. 116 (Longmans, Green – 1947).

*Primary Examiner*—M. Weissman
*Attorney*—Norris & Bateman

[57] ABSTRACT

A method of producing a silicon nitride article comprising forming an article as a compact of silicon powder, sintering the silicon compact in an atmosphere substantially free of nitrogen, machining the silicon compact to a required accuracy, and nitriding the machined silicon compact to produce the silicon nitride article.

3 Claims, No Drawings

3,778,231

METHOD OF PRODUCING SILICON NITRIDE ARTICLES

CROSS REFERENCE TO RELATED APPLICATION

This application is a continuation-in-part of application Ser. No. 749,987, filed Aug. 5, 1968 now abandoned.

BACKGROUND OF THE INVENTION

In the commercial production of articles in silicon nitride by the so-called reaction - sintering process commercial purity silicon powder is first compacted into a coherent mass. In some cases this mass may have the required shape and accuracy and then only requires complete reaction with nitrogen to give the finished article. Very often, however, in order to obtain the required degree of complexity and accuracy a machining operation is required. Fully-nitrided material is virtually unmachinable because of its hardness while compacted silicon powder is too soft and friable. The usual practice, exemplified by British Pat. No. 895,769, is to partially react (i.e., to prenitride) the compacted silicon in a nitrogen-bearing atmosphere so that the gain in strength, essentially due to the formation of about 10% $Si_3N_4$, results in a material of machinable quality.

It is found, however, that the hardenss of such material varies considerably throughout the mass due to non-uniformity of the nitriding action; usually more nitriding takes place on the outer skin of the part than in the interior. Subsequent reaction of the machined part with nitrogen to form $Si_3N_4$ is also found not to proceed to completion even after long periods at temperatures above 1,450°C. The retention of unreacted silicon in the part is deleterious to many properties including strength, thermal-shock resistance and electrical characteristics.

SUMMARY OF THE INVENTION

I have found, and this forms the basis of my invention, that by replacing the so-called prenitriding operation by a sintering operation in a substantially non-nitrogen-bearing atmosphere a material with superior and more consistently uniform machining properties is obtained. Furthermore, the machined material exhibits a large degree of and usually almost complete reaction with nitrogen during the subsequent nitriding operation.

According therefore to this invention silicon nitride articles are produced by first sintering a compact of silicon powder in a protective atmosphere substantially free from nitrogen.

Suitable sintering temperatures have been found to lie between 800°C and 1,400°C and protective atmosphere such as argon, hydrogen, helium, or other gases not containing appreciable quantities of nitrogen may be used.

According to the invention, the actual sintering time of the silicon compact in the nitrogen free atmosphere may be varied, depending upon the sintering temperature employed. For example, the following periods of time have been found to be typically suitable: 20 hours at 1,100°C; 2 hours at 1,200°C; 1 hour at 1,300°C; and 5 minutes at 1,350°C.

As a particular example, a first silicon powder compact sintered in argon for 5 minutes at 1,300°C was found to have very good and uniform machinability and on subsequent nitriding by the usual treatment (about 16 hours at 1,350°C, and 20 hours at 1,450°C) was found to contain less than 1 percent of unreacted silicon. These enhanced properties were also obtained from pre-sintering compacted silicon powder in hydrogen.

On the other hand, a second silicon compact which had been compacted under the same temperature and pressure conditions as the first compact and then prenitrided in a cracked ammonia atmosphere (75 percent hydrogen and 25 percent nitrogen) was found to have inferior and inconsistent machinability and after subsequent nitriding, by the same usual treatment, about 5 percent of unreacted silicon was found to be present in the material.

It has also been found that when a non-protective atmosphere such as air is used, the results are inferior to the employment of either argon or hydrogen, since after the final nitriding treatment the silicon compact has detrimental properties in that it contains areas of free silicon. A further disadvantage arising from the use of air is the necessity to remove a substantial amount of material from the compacted product at the machining stage in order to avoid oxide contamination.

To further illustrate the differences in constituency between silicon compacts which are sintered in a nitrogen-free atmosphere according to the invention and those which are sintered and pre-nitrided in a nitrogen containing atmosphere as in British Pat. No. 895,769, the following tests were performed and results obtained.

A silicon billet was isostatically compacted at 1.5 ton/in$^2$ from nominally −200 mesh silicon powder of commercial purity. The billet was then sectioned into four samples. Samples 1 and 2 were then sintered or prenitrided at 1,200°C for 1 hour in an atmosphere of pure nitrogen according to conventional practice and samples 3 and 4 were sintered at 1,200°C for 1 hour in an atmosphere of pure hydrogen according to the invention.

The constitution of the samples following the sintering process as determined by X-ray analysis, was as follows:

| Sample No. | Constitution | | |
|---|---|---|---|
| | Silicon | $\alpha Si_3N_4$ | $\beta Si_3 N_4$ |
| 1 | Large | Large | Small |
| 2 | Large | Large | Small |
| 3 | Large | Not detected | Not detected |
| 4 | Large | Not detected | Not detected |

In addition, the prenitrided samples 1 and 2 had experienced a mean weight gain of about 13 percent, while samples 3 and 4 experienced a negligible amount of weight gain. The weight gain in samples 1 and 2 was attributable to the formation of the silicon nitride which occurred during the prenitriding step. Such a weight change analysis is conventionally employed as a quality control technique for component production and has been substantiated on many occasions by quantitative X-ray and metallographic methods.

As mentioned previously, silicon articles which are subjected to a prenitriding treatment before they are machined as in the aforementioned British patent contain unreacted silicon following the final nitriding step, and the unreacted silicon deleteriously affects properties such as strength, thermal-shock resistance, and electrical characteristics.

In the invention, it has also been found that the conditions under which the final nitriding operation is carried out are widely variable, provided that substantially all the silicon is converted to silicon nitride. An important factor to be borne in mind is that, as is well known in the art, many factors involved in the production of the compact can effect the conditions required to effect complete nitriding. Two of the prime properties of the silicon compact which affect the nitriding operation are the surface area of silicon available for reaction with the nitrogen and the porosity of the compact which governs the ease with which the nitrogen permeates the compact.

For example, satisfactory results have been obtained by nitriding machined silicon compacts for 100 hours at a temperature of 1,180°C, or for 70 hours at a temperature of 1,250°C, or for 16 hours at a temperature of 1,350°C. These three examples are applicable to compacts formed from a commonly used commercial silicon powder which is nominally $-200$ mesh and has a mean particle size of 20 microns.

However, if a finer silicon powder were used, say about 3 microns average particle size, significantly shorter nitriding time could be utilized because of the greater surface area of silicon available. Similarly, the lower the compacting pressure, the higher the porosity of the compact, and hence, the lower the nitriding time required for complete conversion of the silicon to silicon nitride.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A process for producing a silicon nitride article comprising forming an article as a compact of silicon powder, sintering said silicon compact at a temperature between 1,200°C and 1,400°C in an atmosphere free from nitrogen for a sufficient period of time to form a coherent, self-supporting, machinable compact, machining the sintered silicon compact to a required accuracy, and nitriding the machined silicon compact in a nitrogen rich atmosphere at a high temperature for a length of time sufficient to convert substantially all of the silicon to silicon nitride.

2. A process for producing a silicon nitride article according to claim 1, wherein the silicon compact is sintered in an atmosphere of inert gas such as argon, hydrogen, and helium.

3. A process for producing a silicon nitride article according to claim 1, wherein the machined silicon compact is nitrided at a temperature between 1,180°C and 1,450°C.

* * * * *

UNITED STATES PATENT OFFICE
CERTIFICATE OF CORRECTION

Patent No. 3,778,231    Dated December 11, 1973

Inventor(s) Richard Alan Taylor

It is certified that error appears in the above-identified patent and that said Letters Patent are hereby corrected as shown below:

On the cover sheet at the appropriate location above the classification data, please add the information showing that priority has been claimed as follows:

--Foreign Application Priority Data

Great Britain        41053/67 filed September 8, 1967--.

Signed and sealed this 23rd day of July 1974.

(SEAL)
Attest:

McCOY M. GIBSON, JR.          C. MARSHALL DANN
Attesting Officer             Commissioner of Patents